United States Patent
Fronius et al.

(10) Patent No.: US 9,144,874 B2
(45) Date of Patent: Sep. 29, 2015

(54) MACHINE TOOL HAVING A ROTARY TRANSMITTER FOR DATA

(75) Inventors: Juergen Fronius, Walheim/Neckar (DE); Heiko Graf, Gerlingen (DE); Ewald Hasselkuss, Fellbach (DE)

(73) Assignee: KOMET GROUP GMBH, Besigheim (DE)

( * ) Notice: Subject to any disclaimer, the term of this patent is extended or adjusted under 35 U.S.C. 154(b) by 751 days.

(21) Appl. No.: 13/500,929

(22) PCT Filed: Feb. 24, 2011

(86) PCT No.: PCT/EP2011/052709
§ 371 (c)(1),
(2), (4) Date: Apr. 9, 2012

(87) PCT Pub. No.: WO2011/117038
PCT Pub. Date: Sep. 29, 2011

(65) Prior Publication Data
US 2012/0205880 A1    Aug. 16, 2012

(30) Foreign Application Priority Data
Mar. 26, 2010   (DE) .................. 10 2010 003 338

(51) Int. Cl.
B23P 23/02    (2006.01)
B23P 23/04    (2006.01)
(Continued)

(52) U.S. Cl.
CPC .............. *B23Q 17/007* (2013.01); *B23B 25/06* (2013.01); *B23B 49/00* (2013.01); *B23C 9/005* (2013.01);
(Continued)

(58) Field of Classification Search
CPC ........... Y10T 409/309352; Y10T 409/309296; Y10T 409/30448; Y10T 409/309408; Y10T 408/16; Y10T 483/17; Y10T 408/85; Y10T 409/307224; Y10T 29/5176

USPC .............. 409/231, 230, 144, 232, 193; 408/8, 408/147; 483/16; 29/56.5
See application file for complete search history.

(56) References Cited

U.S. PATENT DOCUMENTS 7,011,613 B2    3/2006   Moller et al.
7,364,393 B2 *  4/2008   Collingwood et al. ....... 409/231
(Continued)

FOREIGN PATENT DOCUMENTS

DE     4201013 A1 *  7/1993
DE     198 43 575 B4    4/2000
(Continued)

OTHER PUBLICATIONS

Machine translation of DE 4201013, which DE '013 was published Jul. 1993.*

(Continued)

*Primary Examiner* — Erica E Cadugan
(74) *Attorney, Agent, or Firm* — Flynn, Thiel, Boutell & Tanis, P.C.

(57) ABSTRACT

The invention relates to a machine tool having a machine frame, a motor-driven machine spindle rotatably mounted on the machine frame, and at least one exchangeable processing head on the machine spindle. The processing head comprises a coupling element compatible with a receiving portion of the machine spindle. Furthermore, a rotary transmitter for data transfer between a stator fixed to the frame and a rotor fixed to the spindle is provided. The invention is characterized in that the machine spindle comprises a plurality of function modules on the spindle side as well as a line system forming a component of a spindle bus to which the function modules on the spindle side are connected to form subscriber stations of the spindle bus and wherein the spindle bus communicates via the rotary transmission path with a field bus fixed to the frame.

13 Claims, 3 Drawing Sheets

(51) Int. Cl.
  B23Q 1/00    (2006.01)
  B23Q 5/28    (2006.01)
  B23C 9/00    (2006.01)
  B23Q 17/00   (2006.01)
  B23Q 17/09   (2006.01)
  B23Q 17/10   (2006.01)
  B23Q 17/12   (2006.01)
  B23K 26/20   (2014.01)
  B23K 3/00    (2006.01)
  B23B 25/06   (2006.01)
  B23Q 5/10    (2006.01)
  B23B 49/00   (2006.01)
  B23Q 17/24   (2006.01)

(52) U.S. Cl.
  CPC . *B23K 3/00* (2013.01); *B23K 26/20* (2013.01); *B23P 23/02* (2013.01); *B23P 23/04* (2013.01); *B23Q 5/10* (2013.01); *B23Q 17/09* (2013.01); *B23Q 17/0985* (2013.01); *B23Q 17/10* (2013.01); *B23Q 17/12* (2013.01); *B23Q 17/24* (2013.01); *B23Q 1/0009* (2013.01); *Y10T 29/5176* (2015.01); *Y10T 279/21* (2015.01); *Y10T 408/16* (2015.01); *Y10T 408/85* (2015.01); *Y10T 409/307224* (2015.01); *Y10T 409/309296* (2015.01); *Y10T 409/309352* (2015.01)

(56) References Cited

U.S. PATENT DOCUMENTS

| | | | |
|---|---|---|---|
| 8,044,822 B2 | 10/2011 | Hoerl et al. | |
| 8,083,446 B2 | 12/2011 | Moeller et al. | |
| 9,004,831 B2 * | 4/2015 | Bierl et al. | 409/231 |
| 2003/0103827 A1 | 6/2003 | Moller et al. | |
| 2008/0180279 A1 | 7/2008 | Hoerl et al. | |
| 2009/0080990 A1 * | 3/2009 | McMurtry et al. | 408/226 |
| 2009/0267429 A1 | 10/2009 | Moeller et al. | |
| 2011/0103912 A1 * | 5/2011 | Fronius et al. | 409/231 |
| 2013/0322889 A1 * | 12/2013 | Graf | 398/141 |
| 2014/0212236 A1 * | 7/2014 | Veittinger | 409/79 |
| 2014/0295755 A1 * | 10/2014 | Graf | 455/41.1 |

FOREIGN PATENT DOCUMENTS

| | | |
|---|---|---|
| DE | 10 2005 011 197 A1 | 9/2006 |
| DE | 10 2007 048 961 A1 | 4/2009 |
| EP | 1 255 627 B1 | 11/2002 |
| EP | 1 762 331 A1 | 3/2007 |
| JP | 61-173803 A * | 8/1986 |
| JP | 64-051211 A * | 2/1989 |

OTHER PUBLICATIONS

Search Report issued in corresponding German Patent Application No. 10 2010 003 338.3 dated Jan. 21, 2011 with English translation of p. 2 (5 pages).

Form PCT/ISA/237 Written Opinion of International Searching Authority dated Jun. 1, 2011 (6 pages).

Form PCT/ISA/210 International Search Report mailed Jun. 1, 2011 with English translation of Categories of documents cited (5 pages).

* cited by examiner

Cutting Tool, Drilling Tool, Milling Tool, Reaming Tool, Welding Tool, Soldering Tool, Hardening Tool, Coating Tool, Lettering Tool, Laser, Cleaning Tool, Measuring Tool, or Camera

FIG. 3

MACHINE TOOL HAVING A ROTARY TRANSMITTER FOR DATA

DESCRIPTION

The invention relates to a machine tool having a machine frame, having a motor-driven machine spindle which is arranged in a rotatable manner on the machine frame, having at least one machining head which can be exchanged on the machine spindle and has a coupling element that is compatible with a receptacle on the machine spindle, and having a rotary transmitter for transmitting data between a stator which is fixed to the frame and a rotor which is fixed to the spindle.

Machine tools of this kind are used for a large variety of manufacturing and metrological tasks. Usually, the various exchangeable machining heads are used for machining metal workpieces, plastics materials or wood. For workpieces which are not rotationally symmetrical, it is possible to carry out lathe-like machining with a rotating spindle which, supported by the machine kinematics, allows additional translational degrees of freedom between the workpiece and the machining head. For this purpose, use is also made for example of facing heads. Facing heads are rotary tool heads which allow a cutting edge to be moved radially with respect to the rotational axis of the spindle. This is put into practice for example in machine tools having special components, such as, for example, spindles having two-stage planetary gears and an additional external drive which makes it possible, when the spindle is rotating, to adjust the driveshaft for the facing slide. To this end, an electrical transmission interface, which allows the machining head to be changed and has a rotary transmitter, is integrated in customary spindle and tool interfaces without impairing the functionality of the mechanism. In principle, the transmission interface in the form of an electrical contactless and/or contacting rotary transmitter can be arranged at the head-side end or at the rear end of the spindle.

Depending on the complexity of the machining steps to be carried out and the mechatronic structure, known machine tools of this kind require considerable construction and wiring complexity, which differs from manufacturer to manufacturer even given identical objectives.

Proceeding from the above, the invention is based on the object of improving machine tools of the type specified at the beginning in such a way that the construction and wiring complexity can be simplified and standardized for all manufacturers.

The combination of features according to the present invention is proposed to achieve this object. Advantageous embodiments and developments of the invention are disclosed.

The solution according to the invention proceeds from the idea that the machine spindle and the machining heads of machine tools have a large number of actuating and sensing functional modules, which can be controlled easily via a central machine controller by way of a standardized spindle-side and head-side bus system. In order to make this possible, it is proposed according to the invention that the machine spindle has a plurality of spindle-side functional modules and also a cable system which forms a constituent part of a spindle bus and to which the spindle-side functional modules are connected in the form of subscriber stations or bus subscribers of the spindle bus, wherein the spindle bus additionally communicates via the rotary transmission path with a field bus which is fixed to the frame. On account of the frequently high spindle speeds, the data are expediently transmitted in a contactless manner from the stator side to the rotor side or vice versa, for example via an inductive, capacitive or optoelectronic transmission path or by radio. The rotary transmission path requires adaptation of the transmission protocols, and so the spindle bus expediently has a protocol converter which is fixed to the rotor and communicates, preferably via a field bus adapter, with the field bus. A protocol converter in this case converts protocols between bus systems that differ in terms of protocols. Protocol converters can be software or hardware products or else any desired combinations of the two.

Since a large number of different machining heads can be exchanged on the machine spindle and the machining heads can have a wide variety of tasks, the machining heads have a plurality of different head-side functional modules. Expediently, a cable system which forms a constituent part of a head bus and to which the head-side functional modules are connected in the form of bus subscribers of the head bus is also provided in the machining head. In this case, the head bus communicates with the spindle bus, and thus also with the field bus fixed to the frame, via a disconnection point. As a rule, both the machine spindle and the machining head contain sensing and/or actuating functional modules.

According to a preferred configuration of the invention, the machine spindle has at least one spindle-side functional module from the group of temperature sensor, vibration sensor, force sensor, pressure sensor, moisture sensor, purging air sensor, lubrication condition sensor, rotational speed sensor, acceleration sensor as measuring element and/or from the group of purging air valve, actuating drive, pneumatic or hydraulic solenoid valve, lubricant dispenser, coolant dispenser, spindle motor as actuator.

If the spindle bus and head bus are compatible with one another, they can be connected galvanically at the disconnection point. In the case of different bus systems, appropriate protocol converters must be used.

A preferred configuration of the invention provides that the machining head has at least one head-side functional module from the group of linear or rotary slide, actuating drive, drive motor, rotary transducer, position sensor, dispenser, heating element, laser, temperature sensor, acceleration sensor. The actuating drive and the drive motor are in this case expediently provided for slide actuation, while the rotary transducer and position sensor are provided for position measurement within a slide system.

For the cleaning, welding and soldering process, on the other hand, the dispensers and heating and cooling modules preferably come into consideration.

The head-side functional modules are preferably equipped with a tool from the group of cutting tool, drilling tool, milling tool, reaming tool, welding tool, soldering tool, hardening tool, coating tool, lettering tool, cleaning tool, measuring tool, camera.

A standardized field bus, preferably a controller area network (CAN) bus or local interconnect network (LIN) bus, preferably comes into consideration as the spindle bus and/or the head bus.

A further preferred configuration of the invention provides that the rotary transmission path has a transceiver for contactless, bidirectional data transmission.

Furthermore, the rotary transmission path can additionally have a transceiver for contactless or galvanic transmission of energy. The spindle bus and the head bus can be connected to a central machine controller via a bus system fixed to the frame.

The invention is explained in more detail in the following text on the basis of an exemplary embodiment illustrated schematically in the drawing, in which:

FIG. 3 schematically shows alternative embodiments of tools.

Figure 1:
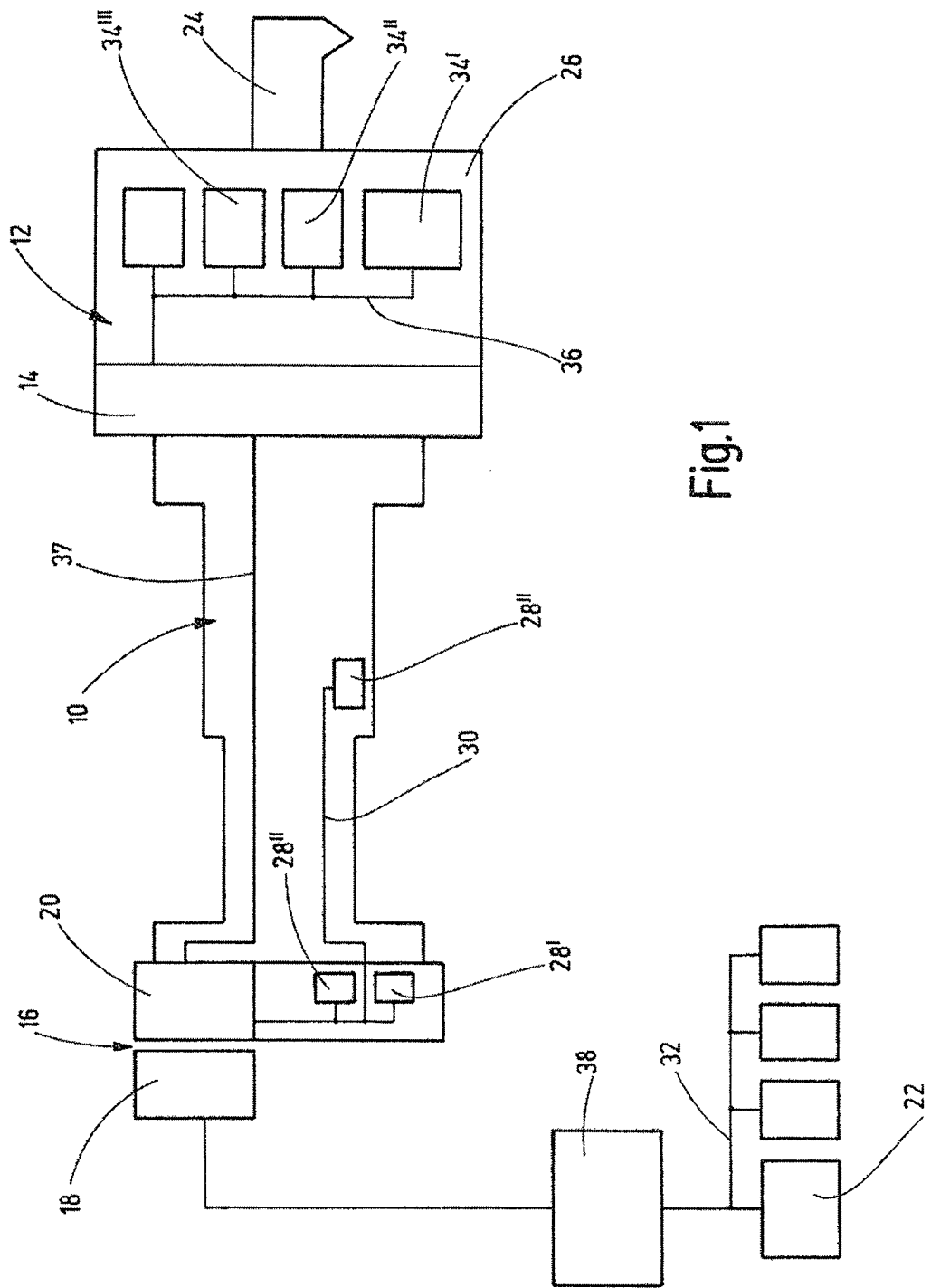
FIG. 1 shows a diagram of a spindle and head controller of a machine tool for machining workpieces.

The machine spindles 10 illustrated schematically in the drawing are a constituent part of a machine tool for machining workpieces, in particular for complete machining, which additionally has a tool magazine (not illustrated in the drawing) and also a handling apparatus for the tools of the machine. The machine spindle 10 is arranged within the machine tool in a machine frame on which it is arranged for example on a cross table such as to be displaceable in three axes X, Y, Z and also to be rotatable, or is motor-driven. A machining head 12 is exchangeable at a mechanical and electrical disconnection point 14 on the machine spindle 10, said machining head 12 having a coupling element which is compatible with a receptacle on the machine spindle. Furthermore, there is provided a rotary transmitter 16 for data transmission between a stator 18 fixed to the frame and a rotor 20 fixed to the spindle.

Furthermore, the machine tool comprises a central machine controller 22 (NC controller), by way of which, inter alia, the movement of the machining tool 24 is controlled in the machining space of the machine tool. On account of the use of three axes X, Y and Z that are perpendicular to one another, every point in the machining space can be reached. In addition, in the exemplary embodiments shown in FIGS. 1 and 2, there is provided a machining head 12 having a facing slide 26 which is displaceable depending on the movement axes of the spindle 10 and which forms an additional, independently controllable U axis. In principle, rather than the facing slide 26 illustrated in the drawing, other kinds of tools can be used as machining head, such as a cutting tool, drilling tool, milling tool, reaming tool, welding tool, soldering tool, hardening tool, coating tool, lettering tool, laser, cleaning tool, measuring tool, camera and the like, as shown schematically in FIG. 3.

A particular feature of the spindle and head controller according to the invention of the machine tool is that the machine spindle 10 has a plurality of spindle-side functional modules 28', 28", 28"' and also a cable system which forms a constituent part of a spindle bus 30. The spindle-side functional modules 28', 28", 28"' are connected to the spindle bus 30, forming subscriber stations. The spindle bus for its part communicates via the rotary transmission path 16 with a field bus 32 fixed to the frame. The functional modules 28', 28", 28"' shown in the two exemplary embodiments can be formed both as sensors and as actuators. In order to monitor the spindle 10, there are provided a multiplicity of such functional modules, which can be monitored, controlled and regulated predominantly via the central machine controller 22. Without going into details about the internal structure of the machine spindle 10, spindle-side functional modules 28', 28", 28"' from the group of temperature sensor, vibration sensor, force sensor, pressure sensor, moisture sensor, purging air sensor, lubrication condition sensor, rotational speed sensor, acceleration sensor, relative acceleration sensor come into consideration as measuring element and/or from the group of purging air valve, actuating drive, pneumatic or hydraulic solenoid valve, lubricant dispenser, coolant dispenser, spindle motor, drives such as rotary drives, actuating drives or linear direct drives, transducers of electrical variables come into consideration as actuator. Individual subscriber stations can also be formed as combination modules for example of a rotational speed sensor or of an actuating drive as purging air sensor and purging air valve.

A further particular feature of the invention consists in the fact that the machining head 12, too, has a plurality of head-side functional modules 34', 34", 34"' and also a cable system forming a constituent part of a head bus 36. In this case, the head-side functional modules 34', 34", 34"' are connected to the head bus 36, forming subscriber stations, wherein the head bus 36 communicates with the spindle bus 30, or a connecting cable 37 provided specifically for this purpose, at the disconnection point 14. Without going into details about the specific structure of the machining head 12, the machining head 12 can have at least one functional module 34', 34", 34"' from the group of linear or rotary slide, actuating drive, drive motor, rotary transducer, position sensor, dispenser, heating element. Furthermore, the functional modules 34', 34", 34"' of the machining head 12 can be equipped with a tool 24 from the group of cutting tool, drilling tool, milling tool, reaming tool, welding tool, soldering tool, hardening tool, coating tool, lettering tool, cleaning tool, measuring tool. The above lists of functional modules are by way of example and therefore not complete.

In the exemplary embodiment shown in FIG. 1, it is indicated that the spindle bus 30 and the head bus 36 are connected in a wireless manner to the field bus 32 of the central machine controller 22 via an additional field bus adapter 38 via the contactless rotary transmission path 16 between the rotor 20 fixed to the spindle and the stator 18 connected to the frame.

Figure 2:
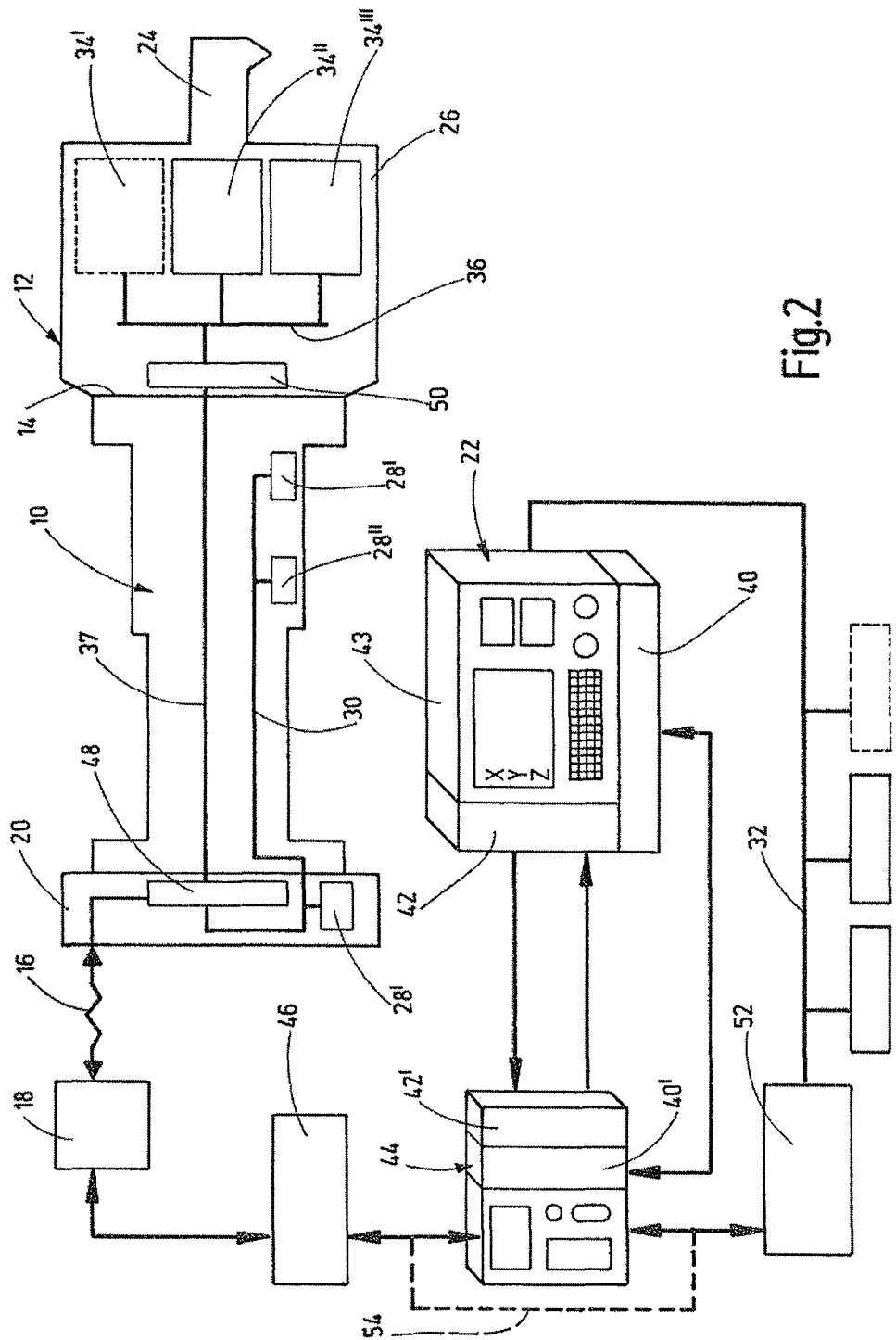
FIG. 2 shows a diagram of an exemplary embodiment, modified with respect to FIG. 1, of the spindle and head controller of a machine tool for machining workpieces.

In the exemplary embodiment according to FIG. 2, the machine controller 22 comprises an NC controller 43 having a PLC interface 40, 40' and an axis interface 42, 42', said NC controller 43 bringing output data for transmission in a contactless manner via an analog NCA control unit 44 and a modulator 46, which modulates the data onto a carrier signal, and via the data transmission path 16 between the stator 18 and the rotor 20. In order to match the protocols between different bus systems, a protocol converter 48, 50 is arranged both in the spindle 10 and in the machining head 12.

As can also be seen from FIG. 2, the digital NC controller can also communicate directly with the modulator 46 of the rotary transmission path 16 via the cable 54 via a standardized field bus 32 and a field bus coupler 52. Advantageously, standardized field bus systems, such as, for example, a CAN bus, are used as spindle bus 30 and as head bus 36, and so tool heads from different manufacturers can be connected without great effort.

In summary, the following can be stated: the invention relates to a machine tool having a machine frame, having a motor-driven machine spindle 10 which is arranged in a rotatable manner on the machine frame, and having at least one machining head 12 which can be exchanged on the machine spindle 10. The machining head 12 has a coupling element that is compatible with a receptacle on the machine spindle 10. Also provided is a rotary transmitter 16 for transmitting data between a stator 18 which is fixed to the frame and a rotor 20 which is fixed to the spindle. A particular feature of the invention is that the machine spindle 10 has a plurality of spindle-side functional modules 28', 28", 28"' and also a cable system which forms a constituent part of a spindle bus 30 and to which the spindle-side functional modules 28', 28", 28"' are connected, forming subscriber stations of the spindle bus 30, and wherein the spindle bus 30 communicates via the rotary transmission path 16 with a field bus 32 which is fixed to the frame. Advantageously, the machining head 12, too, has a plurality of head-side functional modules 34', 34", 34''' and also a cable system which forms a constituent part of a head bus 36 and to which the head-side functional modules are connected, forming subscriber stations, and wherein the head bus 36 communicates with the spindle bus 30 via a disconnection point 14.

LIST OF REFERENCE SIGNS

10 Machine spindle
12 Machining head
14 Disconnection point
16 Rotary transmitter
18 Stator
20 Rotor
22 Machine controller
24 Machining tool
26 Facing slide
28', 28", 28''' Spindle-side functional modules
30 Spindle bus
32 Field bus fixed to the frame
34', 34", 34''' Head-side functional modules
36 Head bus
37 Connecting cable
38 Field bus adapter
40, 40' PLC interface
42, 42' Axis interface
43 NC controller
44 NCA control unit
46 Modulator
48 Protocol converter
50 Protocol converter
52 Field bus coupler
54 Cable

The invention claimed is:

1. A machine tool comprising:
a machine frame,
a motor-driven machine spindle (10) which is arranged in a rotatable manner on the machine frame,
at least one machining head (12) which can be exchanged provided on the machine spindle (10), which at least one machining head has a coupling element that is compatible with a receptacle on the machine spindle (10), and
a rotary transmitter (16) for transmitting data along a transmission path between a stator (18) which is fixed to the frame and a rotor (20) which is fixed to the spindle,
wherein the machine spindle (10) has a plurality of spindle-side functional modules (28', 28", 28''') and also has a cable system which forms a constituent part of a spindle bus (30), and to which spindle bus (30) the spindle-side functional modules (28', 28", 28''') are connected, forming subscriber stations of the spindle bus (30),
wherein the at least one machining head (12) has a plurality of head-side functional modules (34', 34", 34''') and also has a cable system which forms a head bus (36), to which head bus the head-side functional modules (34', 34", 34''') are connected, forming subscribers of the head bus (36),
wherein the head bus (36) communicates with the spindle bus (30) via a disconnection point (14), and
wherein the spindle bus (30) communicates via the transmission path of the rotary transmitter (16) with a field bus (32) which is fixed to the frame.

2. The machine tool as claimed in claim 1, wherein the spindle bus (30) has a protocol converter (48) which is fixed to the rotor and communicates with the field bus (32) which is fixed to the frame.

3. The machine tool as claimed in claim 1, wherein at least one of the spindle-side functional modules (28', 28", 28''') is from the group of temperature sensor, vibration sensor, force sensor, pressure sensor, moisture sensor, purging air sensor, lubrication condition sensor, rotational speed sensor, acceleration sensor, or relative acceleration sensor and/or at least one of the spindle-side functional modules is from the group of purging air valve, actuating drive, pneumatic or hydraulic solenoid valve, lubricant dispenser, coolant dispenser, or spindle motor.

4. The machine tool as claimed in claim 1, wherein a protocol converter (50) is provided in the at least one machining head (12).

5. The machine tool as claimed in claim 1, wherein the head bus (36) is galvanically connected at the disconnection point (14) to the spindle bus (30).

6. The machine tool as claimed in claim 1, wherein at least one of the head-side functional modules (34', 34", 34''') is from the group of linear or rotary slide, actuating drive, drive motor, rotary transducer, position sensor, dispenser, or heating element.

7. The machine tool as claimed in claim 1, wherein the at least one machining head (12) has a tool from the group of cutting tool, drilling tool, milling tool, reaming tool, welding tool, soldering tool, hardening tool, coating tool, lettering tool, cleaning tool, measuring tool, or camera.

8. The machine tool as claimed in claim 1, wherein the spindle bus (30) and/or the head bus (36) is/are in the form of a controller area network (CAN) bus or local interconnect network (LIN) bus.

9. The machine tool as claimed in claim 1, wherein the transmission path of the rotary transmitter (16) is arranged at an end of the machine spindle (10) that is remote from the at least one machining head (12).

10. The machine tool as claimed in claim 1, wherein the at least one machining head (12) has a motor-drivable slide for receiving a tool and also has a regulated positioning system for the slide.

11. The machine tool as claimed in claim 1, wherein the transmission path of the rotary transmitter (16) has a transceiver unit for contactless bidirectional data transmission.

12. The machine tool as claimed in claim 1, wherein the transmission path of the rotary transmitter (16) additionally has a transceiver unit for contactless and/or galvanic transmission of energy.

13. The machine tool as claimed in claim 1, wherein the spindle bus (30) communicates via a field bus adapter (38) with the field bus (32) which is fixed to the frame.

* * * * *